United States Patent
Cherepov

(10) Patent No.: US 7,707,620 B2
(45) Date of Patent: Apr. 27, 2010

(54) METHOD TO CONTROL AND SECURE SETUID/GID EXECUTABLES AND PROCESSES

(75) Inventor: Mikhail Cherepov, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 1391 days.

(21) Appl. No.: 11/124,437

(22) Filed: May 6, 2005

(65) Prior Publication Data

US 2006/0253909 A1 Nov. 9, 2006

(51) Int. Cl.
*G06F 17/00* (2006.01)
*H04L 29/06* (2006.01)

(52) U.S. Cl. .................................. 726/1; 380/200
(58) Field of Classification Search ............... 713/201, 713/168, 200, 170; 719/328; 726/23, 10; 709/224; 380/200
See application file for complete search history.

(56) References Cited

U.S. PATENT DOCUMENTS

| | | | | |
|---|---|---|---|---|
| 5,864,683 A | | 1/1999 | Boebert et al. ............... 709/249 |
| 6,880,083 B1* | | 4/2005 | Korn ......................... 713/170 |
| 6,959,441 B2* | | 10/2005 | Moore ........................ 719/328 |
| 7,134,141 B2* | | 11/2006 | Crosbie et al. ................ 726/23 |
| 2002/0069370 A1* | | 6/2002 | Mack .......................... 713/201 |
| 2002/0108036 A1* | | 8/2002 | Okaue ........................ 713/168 |
| 2002/0108055 A1* | | 8/2002 | Okaue ........................ 713/200 |
| 2003/0051026 A1* | | 3/2003 | Carter et al. ................ 709/224 |

OTHER PUBLICATIONS

Jaehong Park; Towards usage control models: beyond traditional access control; Year of Publication: 2002; ACM New York, NY, USA; pp. 57-64.*

* cited by examiner

*Primary Examiner*—Kambiz Zand
*Assistant Examiner*—Monjour Rahim
(74) *Attorney, Agent, or Firm*—BainwoodHuang

(57) ABSTRACT

A method and apparatus for securing executables and processes having setuid/gid permissions and privileges is presented. A mechanism is provided to track and control operations for files and processes having setuid/gid privileges. A policy rule is defined for controlling the operations on the files and processes. The policy rule is then used to control operations involving the files and processes.

21 Claims, 3 Drawing Sheets

METHOD TO CONTROL AND SECURE SETUID/GID EXECUTABLES AND PROCESSES

BACKGROUND

Computer systems, networks and data centers are exposed to a constant and differing variety of attacks that may compromise the security and/or operation of the system. Examples include various forms of malicious software program attacks such as viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Virus attacks, worm attacks, and Trojan horse attacks are variants of each other that generally involve the execution of a program, for which a user often is unaware of its existence, that performs some undesired processing operations to comprise a computer's proper operation.

Other malicious programs operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computers to silently obtain otherwise confidential information such as usernames and passwords required to access protected data, lists, contents of files or even a remote web site's user account information.

Computer system developers, software developers and security experts have produced many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM, which a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include denial-of-service attacks, buffer overflow operations, execution of malformed application data, and execution of malicious mobile code. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Denial of service attacks may also seek to crash the targeted machine, rather than simply consume resources. Buffer overflow attacks occur when programs do not provide appropriate checks of data stored in internal data structures within the software that result in overwriting of surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks or allowing data stream parsing errors.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

Another conventional methodology used to control behavior in a system is through the use of an access control list (ACL). The access control list is a concept in computer security, used to enforce privilege separation. It is a means of determining the appropriate access rights to a given object given certain aspects of the user process that is requesting them, principally the process's user identity.

An ACL typically comprises a table that tells a computer operating system which access rights each user has to a particular system object, such as a file directory or individual file. Each object has a security attribute that identifies its access control list. The list has an entry for each system user with access privileges. The most common privileges include the ability to read a file (or all the files in a directory), to write to the file or files, and to execute the file (if it is an executable file, or program). Each ACL has one or more access control entries (ACEs) including the name of a user or group of users. For each of these users or groups roles, the access privileges are stated in a string of bits called an access mask. Generally, the system administrator or the object owner creates the access control list for an object.

Unix-derived systems use a setuid/gid mechanism to change a process's privileges. A user process executing a setuid/gid program gets the "effective" user ID equal to that of the program's owner. This method is commonly used to allow users a kind of privileged access implemented by the setuid/gid program (e.g., changing a user's password). Hence, nefarious users have long targeted setuid/gid files and processes. A common technique used by such nefarious users is to alter a setuid/gid program to allow an intruder to gain unauthorized privileged access, or to subvert a setuid/gid program (e.g., via a buffer overflow) to perform unauthorized operations. Thus, setuid/gid executables (particularly those owned by a superuser), as well as the behavior of processes created from setuid/gid executables, require extra attention and protection.

There have been various intrusion-detection solutions to ensure integrity of setuid files. Some involve running auditing tools that detect any changes in setuid files by examining modification timestamps, checksums and the like. Unix-like operating systems aiming to provide increased security (such as SELinux or GEMSOS) choose to limit the scope of the setuid operation by obviating the all-powerful "root" superuser, or circumscribing setuid with mandatory permissions.

Dynamic behavior of setuid processes is also an object of conventional research and intrusion-detection tools. Some tools analyze audit records from execution of setuid files and detect misuse by spotting statistical anomalies, attack signatures, and other methods.

SUMMARY

Conventional mechanisms, such as those explained above, suffer from a variety of deficiencies. One such deficiency is that an intrusion is detected after the fact, in that an alarm is raised after the damage has been done. Another deficiency associated with certain conventional mechanisms is that they require the downloading of the latest versions of virus definitions in order to combat attacks of the various viruses. A deficiency associated with the use of ACLs is that they are cumbersome, can be quite complex to properly implement, and can become desynchronized with the files being protected.

Embodiments of the invention significantly overcome such deficiencies and provide mechanisms and techniques that provide a method to control and secure setuid/gid executables and processes. In a particular embodiment of a method for securing executables and processes, a mechanism is provided to track and control operations for files having setuid/gid permissions and for processes having setuid/gid privileges. A policy rule controlling the operations on the files and processes is defined, and the policy rule is used to control operations involving the files and processes.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method for securing executables and processes as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method to control and secure setuid/gid executables and processes as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The owner of a system may be concerned that the system is vulnerable to hackers, user error or security threats. Potential vulnerabilities may include easily guessed username/password combinations, intentional buffer overflows, session ID generation, the unauthorized use of setuid/gid programs and processes, and the like.

In certain operating systems (e.g., Unix), users are identified by a number referred to as a user identifier (UID). UIDs are the basis for accounting, for controlling the use of disk space, for accessing the file system, and for restricting access to privileged kernel operations within an operating system. In these types of operating systems users are organized into groups. Each group is assigned a number called a group identifier (GID). Similar to UIDs, GIDs are used in the access-control facilities provided by the file system. Each operating system process may be associated with a user. The state of the process includes the UID and a set of GIDs. A processing file system access privileges are defined by the UID and GIDs of the process. Only certain users are permitted to alter the UID and GIDs of a process. When a user logs in, a login program sets the UID and GIDs for that user. All processes run from this user inherit the appropriate UID and GID identifiers. SetUID and SetGID programs can be used to provide controlled access to files or services. Therefore, it is important to prevent unauthorized use of the setuid/gid programs and processes.

One method of preventing the potential compromise of system security involves using a Security Agent (SA). The SA provides threat protection for server and desktop computing systems, also known as endpoints. The SA helps to reduce operational costs by identifying, preventing, and eliminating known and unknown security threats. The SA consolidates endpoint security functions in a single agent, providing host intrusion prevention, spyware/adware protection, protection against buffer overflow attacks, distributed firewall capabilities, malicious mobile code protection, operating-system integrity assurance, application inventory and audit log-consolidation. One example of an SA is the Cisco Security Agent (CSA) available from Cisco Systems, Inc. of San Jose, Calif.

Figure 1:
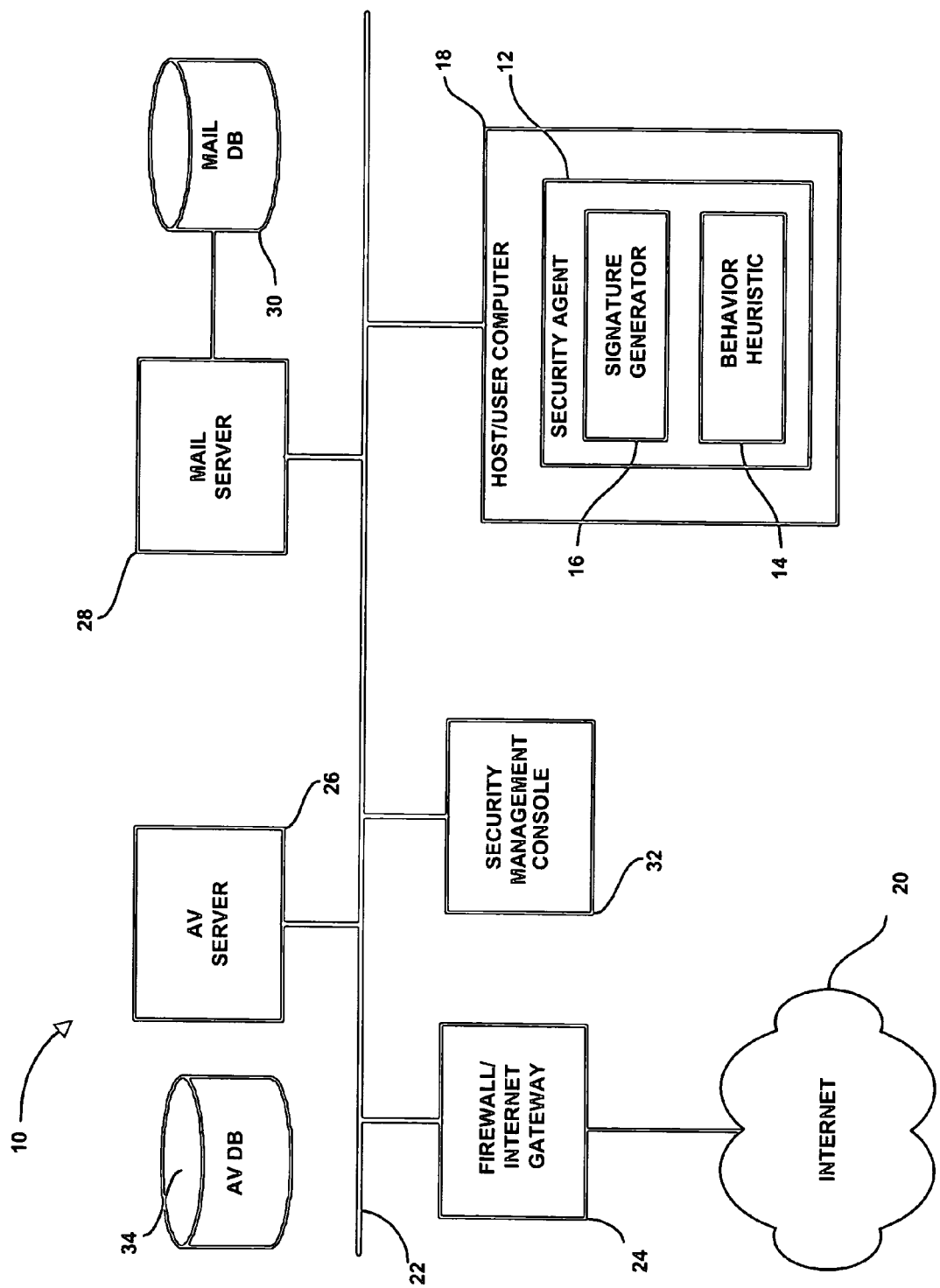
FIG. 1 is a block diagram of a particular implementation of a system for controlling and securing setuid/gid executables and processes in accordance with embodiments of the invention.

Referring to FIG. 1, an embodiment of a CSA system is shown. The CSA environment 10 includes one or more security agents 12 on a host computer 18. The host computer 18 couples to a public access network such as the Internet 20 via a local interconnection 22 such as a local area network (LAN) and a local Internet Service Provider (ISP) 24 or other Internet connection or gateway. The LAN 22 also couples an AV server 26, a mail server 28, and a security management console (MC) 32. The security agent 12 reports any malware objects and signatures to management console 32. The management console 32 may choose to distribute the signature to other agents 12 to prevent access to the malicious object and therefore prevent propagation of undesirable effects of the malware object.

In operation, as indicated above, the security agent 12 performs a multi-tiered inquiry for identifying undesirable transmissions. The undesirable transmissions include malicious communications; typically email based, such as viruses and worms, but may extend to other communications that may cause harmful, annoying, or inefficient operation such as excessive unsolicited email (commonly referred to as SPAM).

A particular tier includes a behavioral based, subject approach, which focuses on the operations (actions) of a process or thread performing the behavior associated with an alleged undesirable communication. Another tier includes an object based matching approach that focuses on the content of a subject of the behavior, typically a file or port, and usually includes signature or fingerprint matching. Accordingly, the security agent 12 employs one or more behavior heuristics 14 enumerating steps indicative of undesirable transmissions. The security agent 12 also includes a signature generator 16, such as a hash engine, for producing a signature or fingerprint corresponding to an object indicative of an undesirable transmission, such as a file containing a virus. The exemplary configuration discussed herein includes a two-tiered approach (subject and object), although alternate configurations employ multiple tiers. The integration of two or more mechanisms, as disclosed herein, results in a stronger, more accurate determination of undesirable transmissions than either of the tiers is likely to yield alone.

The exemplary environment 10 also include a mail server 28 having a mail database 30 for storing email messages, frequently the vehicle by which undesirable transmissions arrive. An anti virus (AV) server 26 couples to an AV database 34 for storing the aforementioned vendor supplied AV signatures.

Embodiments of the present invention allow the control of access to and creation of setuid/gid files, and allows the control and monitoring of processes created from those files. In a particular embodiment, the setuid/gid property is specified along with the filename and other properties on the Management Console (MC) 32. A policy rule is defined which controls read, write, and attribute change operations. A rule controlling an operation applies to a file whether the file's initial attributes match the description, or the outcome of a successful operation will change those attributes to match the description. For example, a rule may trigger in the following scenarios: chmod is trying to change a non-setuid file to setuid, creat is trying to create a setuid file, and a write operation tries to modify an existing setuid file.

In the event a policy rule regarding the setuid/gid privileges is triggered, the following actions can occur. The system can allow the operation to take place, deny the operation—thereby protecting the file from unauthorized operations, terminate the process, tag the acting process or launch a query (e.g., as a pop up). A process created from executing a setuid/gid file can be "tagged" and made controllable by MC-specified rules: e.g., it can be put in a "suspected virus" class. Execution of processes involving setuid/gid files can be controlled by rules, for cases where a process tries to execute a controlled setuid file, as well as the case where a program already executing the controlled setuid/gid file tries to execute another program. The setuid property is combined with other properties of the file (pathname, magic number) in the file set description. The rules are enforced via a CSA Stateful Reference Monitor (shown in FIG. 1 and discussed above). The invention also allows for easy profiling and analysis of setuid/gid executables on systems running CSA. The user can combine the convenience and wide compatibility of the setuid/gid mechanism with preventive security. This solution offers policy-based control over creation of setuid/gid files by any means including an attribute (mode) change, renaming, and a create system call. In addition to setuid/gid process control the user can comprehensively monitor those processes for subsequent analysis and policy development. Likewise, the user can monitor accesses to setuid/gid executables.

Figure 2:
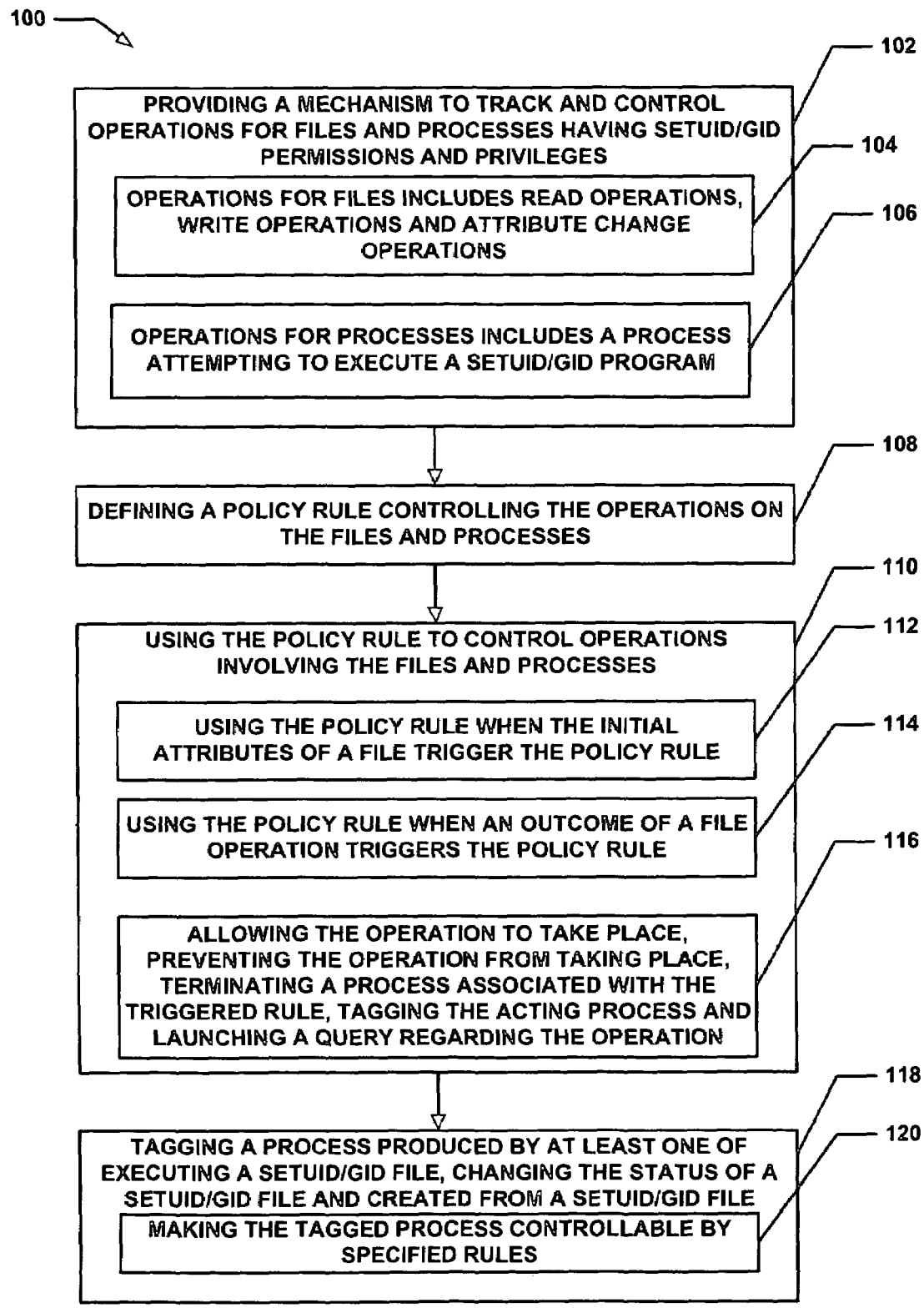
FIG. 2 comprises a flow diagram of a particular embodiment of a method for controlling and securing executables and processes in accordance with embodiments of the invention.

A flow chart of a particular embodiment of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of securing setuid/gid executables and processes is shown. The method 100 begins with processing block 102 wherein a mechanism to track and control operations for files and processes having setuid/gid permissions and privileges is provided. For example, processes that have been determined to be security sensitive are tagged, such that more rigorous CSA rules are applied. In processing block 104, the operations for files include read operations, write operations and attribute change operations. As shown in processing block 106 the operations for processes include a process attempting to execute a setuid/gid program.

In processing block 108, a policy rule controlling the operations on the files and processes is defined. The policy rule is defined by an authorized party, e.g., a Management Console administrator.

In processing block 110, the policy rule is used to control operations involving the setuid/gid files and processes. There are several conditions wherein the policy rule may be invoked. As shown in processing block 112, the initial attributes of a file may trigger the policy rule. As shown in processing block 114, an outcome of a file operation may trigger the policy rule. Processing block 116 shows that the application of the policy rule may provide different results. The policy rule may allow an operation to take place, may prevent the operation from taking place, may terminate the process associated with the triggered rule, or may launch a query regarding the operation. This may also tag the process taking the action, e.g., the process writing or changing the setuid file controlled by the rule, or the process launching a setuid program. This is a separate action from that specified in block 118, where the rule tags the setuid process just launched.

The method 100 may further include tagging a process produced by executing a setuid/gid file, changing the status of a setuid/gid file or created from a setuid/gid file, as show in processing block 118. In processing block 120, the tagged process may be made controllable by specific rules.

Figure 3:
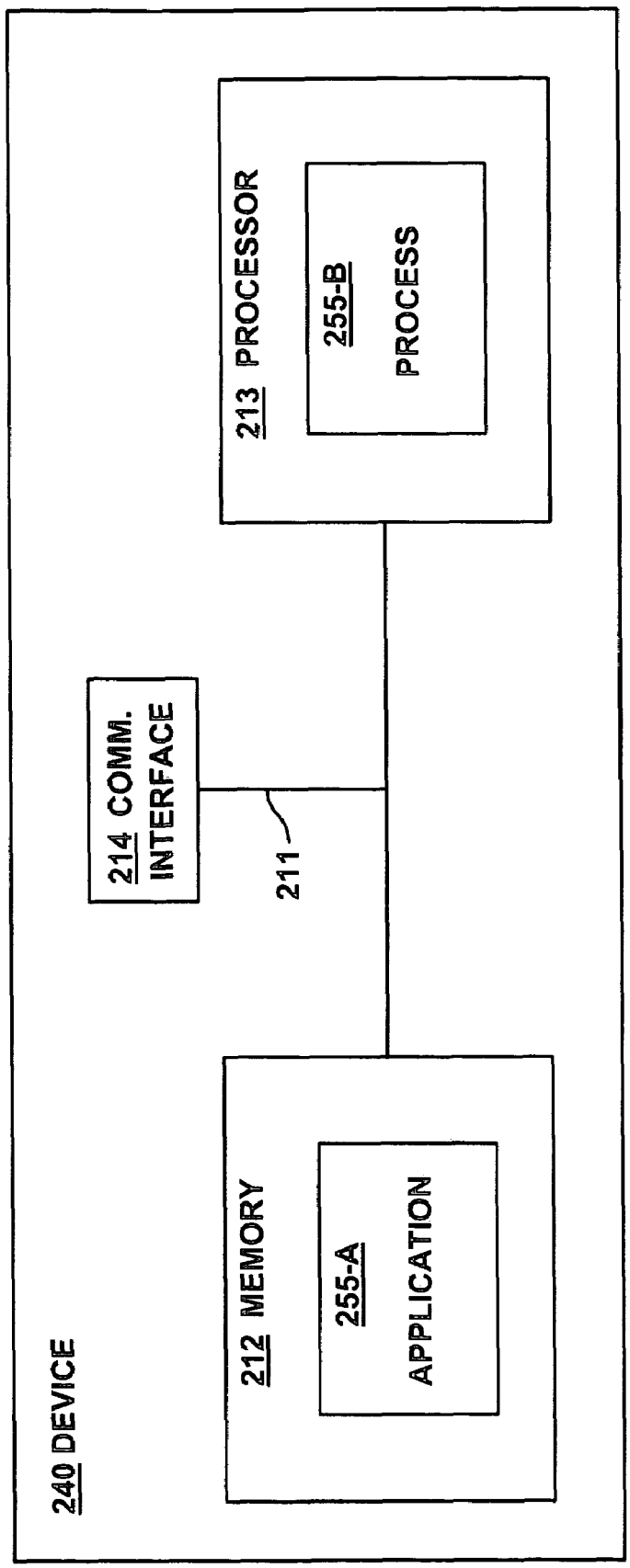
FIG. 3 illustrates an example computer system architecture for a computer system that performs controlling and securing of setuid/gid executables and processes in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of securing executables and processes comprising:
providing a mechanism to track and control operations for files having setuid/gid permissions and processes having setuid/gid privileges;
defining a policy rule controlling said operations on said files and said processes; and
using said policy rule to control operations involving said files and said processes;
wherein using said policy rule to control operations involving said files and said processes comprises:
receiving an operation communication associated with a setuid/gid property, the operation communication targeting at least one of the files having setuid/gid permissions and the processes having setuid/gid privileges:
prior to allowing the operation communication to target the at least one of the files having setuid/gid permissions and the processes having setuid/gid privileges, triggering a rule associated with the operation communication in response to receiving the operation communication, the rule configured to control access to the at least one of the files having setuid/gid permissions and the processes having setuid/gid privileges; and
based on the rule associated with the operation communication, either allowing the operation communication to target the at least one of the files having setuid/gid permissions and the processes having setuid/gid privileges or disallowing the operation communication to target the at least one of the files having setuid/gid permissions and the processes having setuid/gid privileges.

2. The method of claim 1 wherein said operations for files include at least one of read operations, write operations and attribute change operations.

3. The method of claim 1 wherein said operations for processes includes a process attempting to execute a setuid/gid program.

4. The method of claim 1 wherein said using said policy rule comprises using said policy rule when the initial attributes of a file trigger said policy rule.

5. The method of claim 1 wherein said using said policy rule comprises using said policy rule when an outcome of a file operation triggers said policy rule.

6. The method of claim 1 wherein when said policy rule is triggered, allowing at least one of the actions selected from the group comprising allowing said operation to take place, preventing said operation from taking place, terminating a process associated with said triggered rule, and launching a query regarding the operation.

7. The method of claim 1 further comprising tagging a process produced by at least one of executing a setuid/gid file, changing a setuid/gid status of a file and created from a setuid/gid file.

8. The method of claim 1, wherein receiving the operation communication associated with the setuid/gid property, the operation communication targeting at least one of the files having setuid/gid permissions and the processes having setuid/gid privileges comprises receiving the operation communication associated with the setuid/gid property, the operation communication configured to at least one of read the files having setuid/gid permissions, write to the files having setuid/gid permissions, change the files having setuid/gid permissions, and execute the processes having setuid/gid privileges.

9. The method of claim 1, wherein in, response to allowing the operation communication to target the at least one of the files having setuid/gid permissions and the processes having setuid/gid privileges, tagging the processes having setuid/gid privileges executed by the operation communication, the tagged processes having setuid/gid privileges controlled by a process execution policy rule.

10. The method of claim 1, wherein the files having setuid/gid permissions are configured as files associated with a user having a set user identifier (uid)/group identifier(gid) and processes having setuid/gid privileges are configured as processes operating from a user having the set uid/gid.

11. The method of claim 1, wherein:
prior to triggering a rule associated with the operation communication, detecting at least one of a behavior associated with the operation communication and an attribute of a file having setuid/gid permissions and process having setuid/gid privileges requested by the operation communication; and
based upon detecting at least one of an adverse action associated with the detected behavior of the operation communication and a preset attribute of the file having setuid/gid permissions and process having setuid/gid privileges requested by the operation communication, triggering the policy rule.

12. The method of claim 7 wherein said tagging a process further comprises making said tagged process controllable by specified rules.

13. A computer system comprising:
a memory;
a processor;
a communications interface;
an interconnection mechanism coupling the memory, the processor and the communications interface; and
wherein the memory is encoded with an application for securing executables and processes that when performed on the processor, provides a process for processing information, the process causing the computer system to perform the operations of:
providing a mechanism to track and control operations for files having setuid/gid permissions and processes having setuid/gid privileges;
defining a policy rule controlling said operations on said files and said processes; and using said policy rule to control operations involving said files and said processes;
wherein when using said policy rule to control operations involving said files and said processes, the computer system is configured to:
receiving an operation communication associated with a setuid/gid property, the operation communication targeting at least one of the files having setuid/gid permissions and the processes having setuid/gid privileges;
prior to allowing the operation communication to target the at least one of the files having setuid/gid permissions and the processes having setuid/gid privileges, triggering a rule associated with the operation communication in response to receiving the operation communication, the rule configured to control access to the at least one of the files having setuid/gid permissions and the processes having setuid/gid privileges; and
based on the rule associated with the operation communication, either allowing the operation communication to target the at least one of the files having setuid/gid permissions and the processes having setuid/gid privileges or disallowing the operation communication to target the at least one of the files having setuid/gid permissions and the processes having setuid/gid privileges.

14. The computer system of claim 13 wherein said operations for files includes at least one of read operations, write operations and attribute change operations.

15. The computer system of claim 13 wherein said operations for processes includes a process attempting to execute a setuid/gid program.

16. The computer system of claim 13 wherein said using said policy rule comprises using said policy rule when the initial attributes of a file trigger said policy rule.

17. The computer system of claim 13 wherein said using said policy rule comprises using said policy rule when an outcome of a file operation triggers said policy rule.

18. The computer system of claim 13 wherein when said policy rule is violated, allowing at least one of the actions selected from the group comprising allowing said operation to take place, preventing said operation from taking place, terminating a process associated with said triggered rule, and launching a query regarding the operation.

19. The computer system of claim 13 further comprising tagging a process produced by at least one of executing a setuid/gid file, changing a setuid/gid status of a file and created from a setuid/gid file.

20. The computer system of claim 19 further comprising making said tagged process controllable by specified rules.

21. A system for securing executables and processes comprising:
means for providing a mechanism to track and control operations for files and processes having setuid/gid privileges;
means for defining a policy rule controlling said operations on said files and said processes;
means for using said policy rule to control operations involving said files and said processes; and
means for tagging a process produced by at least one of executing a setuid/gid file, changing a setuid/gid status of a file and created from a setuid/gid file;
wherein means for using said policy rule to control operations involving said files and said processes comprises:
receiving an operation communication associated with a setuid/gid property, the operation communication targeting at least one of the files having setuid/gid permissions and the processes having setuid/gid privileges;

prior to allowing the operation communication to target the at least one of the files having setuid/gid permissions and the processes having setuid/gid privileges, triggering a rule associated with the operation communication in response to receiving the operation communication, the rule configured to control access to the at least one of the files having setuid/gid permissions and the processes having setuid/gid privileges; and based on the rule associated with the operation communication, either allowing the operation communication to target the at least one of the files having setuid/gid permissions and the processes having setuid/gid privileges or disallowing the operation communication to target the at least one of the files having setuid/gid permissions and the processes having setuid/gid privileges.

* * * * *